(12) United States Patent
Ahn et al.

(10) Patent No.: US 10,158,467 B2
(45) Date of Patent: Dec. 18, 2018

(54) METHOD AND APPARATUS FOR TRANSMITTING UPLINK DATA BASED ON HYBRID BEAMFORMING IN A WIRELESS COMMUNICATION SYSTEM

(71) Applicant: LG ELECTRONICS INC., Seoul (KR)

(72) Inventors: Minki Ahn, Seoul (KR); Jiwon Kang, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 21 days.

(21) Appl. No.: 15/456,364

(22) Filed: Mar. 10, 2017

(65) Prior Publication Data

US 2018/0034606 A1 Feb. 1, 2018

Related U.S. Application Data

(60) Provisional application No. 62/369,175, filed on Jul. 31, 2016.

(51) Int. Cl.
| | |
|---|---|
| *H04B 7/06* | (2006.01) |
| *H04L 5/00* | (2006.01) |
| *H04L 1/00* | (2006.01) |
| *H04L 1/18* | (2006.01) |

(52) U.S. Cl.
CPC ......... *H04L 5/0048* (2013.01); *H04B 7/0617* (2013.01); *H04L 1/0009* (2013.01); *H04L 1/0015* (2013.01); *H04L 1/189* (2013.01); *H04L 5/0055* (2013.01)

(58) Field of Classification Search
None
See application file for complete search history.

(56) References Cited

U.S. PATENT DOCUMENTS

| | | | | |
|---|---|---|---|---|
| 2009/0257389 | A1* | 10/2009 | Mohanty | H04W 72/0406 370/329 |
| 2009/0323641 | A1* | 12/2009 | Futagi | H04L 1/0003 370/335 |
| 2010/0182951 | A1* | 7/2010 | Park | H04L 1/0003 370/328 |
| 2012/0276896 | A1* | 11/2012 | Ren | H04L 1/0003 455/423 |
| 2013/0095748 | A1* | 4/2013 | Hu | H04L 1/0003 455/8 |
| 2013/0163462 | A1* | 6/2013 | Ohwatari | H04B 7/0865 370/252 |

(Continued)

*Primary Examiner* — Ajit Patel
(74) *Attorney, Agent, or Firm* — Lee, Hong, Degerman, Kang & Waimey

(57) ABSTRACT

Provided are a method and an apparatus for transmitting uplink data based on hybrid beamforming in a wireless communication system. Specifically, a user equipment (UE) receives a first modulation and coding scheme (MCS) determined based on a sounding reference signal from a base station (BS) through an uplink grant. The UE determines an MCS offset based on a variation of an uplink channel when the variation of the uplink channel between a subframe for transmitting the sounding reference signal and a subframe for receiving the uplink grant is a threshold or greater. The UE transmits uplink data to the BS using a second MCS acquired from the first MCS and the MCS offset.

16 Claims, 13 Drawing Sheets

(56) References Cited

U.S. PATENT DOCUMENTS

| | | | |
|---|---|---|---|
| 2013/0322376 A1* | 12/2013 | Marinier | H04W 72/06 370/329 |
| 2014/0293900 A1* | 10/2014 | Takeda | H04L 5/0073 370/329 |
| 2016/0226623 A1* | 8/2016 | Froberg Olsson | H04L 1/0023 |
| 2016/0285935 A1* | 9/2016 | Wu | H04W 4/90 |
| 2018/0006702 A1* | 1/2018 | Doostnejad | H04B 7/0639 |
| 2018/0048498 A1* | 2/2018 | Stern-Berkowitz | H04L 27/0006 |
| 2018/0054246 A1* | 2/2018 | Kong | H04B 7/0857 |
| 2018/0092105 A1* | 3/2018 | Lee | H04W 72/10 |

* cited by examiner

METHOD AND APPARATUS FOR TRANSMITTING UPLINK DATA BASED ON HYBRID BEAMFORMING IN A WIRELESS COMMUNICATION SYSTEM

CROSS-REFERENCE TO RELATED APPLICATIONS

Pursuant to 35 U.S.C. § 119(e), this application claims the benefit of U.S. Provisional Patent Application No. 62/369,175, filed on Jul. 31, 2016, the contents of which are hereby incorporated by reference herein in its entirety.

BACKGROUND OF THE INVENTION

Field of the Invention

The present invention relates to wireless communications, and more particularly, to a method of transmitting uplink data based on hybrid beamforming in a wireless communication system, and an apparatus using the same.

Related Art

Methods for supporting a higher data transmission rate have been studied for a wireless communication system to satisfy a steadily increasing demand for wireless data traffic. As one of these methods, a beamforming-based base station employing a wide frequency band of a millimeter wave (mmWave) band is used, expecting a drastic increase in capacity of the cellular system.

Meanwhile, to transmit a plurality of pieces of information to a single user or multiple users, a Multi Input Multi Output (MIMO) system, which is considered in the existing Long Term Evolution (LTE)-Advanced standard, has multiple digital paths or radio frequency (RF) chains. When MIMO communication is performed using these multiple digital paths, a performance gain, such as a diversity gain or multiplexing gain, may be obtained. However, when the number of digital paths is increased to obtain a higher gain, issues about synchronization between digital paths, costs, and operational complexity may arise.

A millimeter wave band system may offset the disadvantage of path attenuation by a beamforming gain using a large number of physical antennas. However, in the existing MIMO system, a digital beamforming technique involves one RF chain for one physical antenna and thus needs a large number of RF chains, which causes problems of costs and operational complexity. Thus, a hybrid beamforming system using digital beamforming and analog beamforming at the same time may be considered for efficient communication in a millimeter wave band. Analog beamforming may form a narrow beam by connecting an array of a plurality of physical antennas to one RF chain and using a phase shifter. As compared with digital beam forming, analog beamforming is inferior in bam sharpness and flexibility in directional adjustment, but has low implementation costs and low complexity due to no increase in the number of digital paths. A hybrid beamforming system resulting from an appropriate combination of advantages and disadvantages of digital beamforming and analog beamforming may be considered in order to efficiently obtain a high communication capacity in a millimeter wave band.

SUMMARY OF THE INVENTION

The present specification provides a method and an apparatus for transmitting uplink data based on hybrid beamforming in a wireless communication system.

The present specification proposes a method of transmitting uplink data based on hybrid beamforming in a wireless communication system.

First, a user equipment (UE) receives a first modulation and coding scheme (MCS) determined based on a sounding reference signal from a base station (BS) through an uplink grant. The BS may determine the first MCS corresponding to the UE by determining the position and moving pattern of the UE through the sounding reference signal in a hybrid beamforming system.

When a variation of an uplink channel between a subframe for transmitting the sounding reference signal and a subframe for receiving the uplink grant is a threshold or greater, the UE determines an MCS offset based on the variation of the uplink channel. The subframes may correspond to a specified time. That is, when a drastic change in the channel occurs by a factor, such as the rotation of the UE, between the transmission time of the sounding reference signal and the reception time of the uplink grant, the first MCS designated by the BS may not be supported. Thus, to cope with this change of the channel, the UE may estimate the MCS offset to determine a new MCS (second MCS).

When the variation of the uplink channel between the subframe for transmitting the sounding reference signal and the subframe for receiving the uplink grant is the threshold or greater, the MCS offset may be set to a value greater than 0 (optional behavior). However, when the variation of the uplink channel between the subframe for transmitting the sounding reference signal and the subframe for receiving the uplink grant is less than the threshold, the MCS offset may be set to 0 (default behavior).

The threshold for determining a change level of the uplink channel may be determined by measuring a downlink channel through uplink/downlink channel reciprocity. That is, the threshold may be determined based on a measurement of the downlink channel. The measurement of the downlink channel may be determined based on a first downlink reference signal used in the subframe for transmitting the sounding reference signal and a second downlink reference signal used in the subframe for receiving the uplink grant. That is, the threshold may be determined by comparing a measurement of the downlink channel measured through the first downlink reference signal and a measurement of the downlink channel measured through the second downlink reference signal.

Here, the first downlink reference signal and the second downlink reference signal may include a beam reference signal (BRS), a beam refinement reference signal (BRRS), or a channel state information-reference signal (CSI-RS).

The UE transmits uplink data using a second MCS acquired from the first MCS and the MCS offset. The second MCS may be obtained using a difference between the first MCS and the MCS offset. Accordingly, the hybrid beamforming system may deal with a drastic change of the uplink channel that may occur by the use of a sharp analog beam. The MCS offset may be transmitted along with the uplink data.

For example, when an error occurs in transmitting the uplink data and in transmitting the MCS offset, the UE may receive an NACK of the uplink data and a third MCS arbitrarily set by the BS from the BS through an uplink grant. The third MCS may correspond to a retransmitting uplink (UL) MCS designated by the BS. The UE may compare the second MCS selected by the UE with the third MCS to determine that the BS fails to receive the MCS offset. Further, the UE may determine through the NACK of the uplink data that the BS also fails to receive the uplink data.

Accordingly, the UE may retransmit the uplink data to the BS using a fourth MCS acquired from the first MCS and a value greater than the MCS offset. That is, the UE may determine that an uplink channel environment is poor and thus may retransmit the uplink data through the fourth MCS having a smaller value than the second MCS.

For another example, when an error occurs in transmitting the uplink data, the UE may receive an NACK of the uplink data and the second MCS from the BS through an uplink grant. The UE may determine through the NACK of the uplink data that the BS fails to receive the uplink data. However, the UE receives the very second MCS selected by the UE is and thus may determine that the BS successfully receives the MCS offset. Accordingly, the UE may retransmit the uplink data to the BS using the second MCS.

For another example, when no error occurs in transmitting the uplink data and in transmitting the MCS offset, the UE may receive an ACK of the uplink data and information on remaining uplink data indicated by a buffer status report from the BS through an uplink grant. The buffer status report may be included in an additional scheduling request transmitted along with the uplink data. That is, the BS estimates uplink data quantity through the buffer status report included in the additional scheduling request. Since the MCS level is reduced by the MCS offset from the first MCS to the second MCS, there may be remaining data for the UE to transmit to the BS due to insufficient uplink resources. That is, the BS transmits scheduling information for transmitting the remaining uplink data to the UE through an uplink grant. Accordingly, the UE may transmit the remaining uplink data to the BS using the second MCS.

The MCS offset and the additional scheduling request may be transmitted, piggybacking on a physical uplink shared channel (PUSCH), or may be transmitted through a physical uplink control channel (PUCCH). That is, the second MCS and the additional scheduling request may be transmitted along with the uplink data.

Further, the present specification proposes an apparatus for transmitting uplink data based on hybrid beamforming in a wireless communication system.

The apparatus may be a UE. The apparatus includes a radio frequency (RF) unit to transmit and receive a radio signal, and a processor connected to the RF unit. First, the processor receives a first modulation and coding scheme (MCS) determined based on a sounding reference signal from a base station (BS) through an uplink grant. The BS may determine the first MCS corresponding to the UE by determining the position and moving pattern of the UE through the sounding reference signal in a hybrid beamforming system.

When a variation of an uplink channel between a subframe for transmitting the sounding reference signal and a subframe for receiving the uplink grant is a threshold or greater, the processor determines an MCS offset based on the variation of the uplink channel. The subframes may correspond to a specified time. That is, when a drastic change in the channel occurs by a factor, such as the rotation of the UE, between the transmission time of the sounding reference signal and the reception time of the uplink grant, the first MCS designated by the BS may not be supported. Thus, to cope with this change of the channel, the UE may estimate the MCS offset to determine a new MCS (second MCS).

When the variation of the uplink channel between the subframe for transmitting the sounding reference signal and the subframe for receiving the uplink grant is the threshold or greater, the MCS offset may be set to a value greater than 0 (optional behavior). However, when the variation of the uplink channel between the subframe for transmitting the sounding reference signal and the subframe for receiving the uplink grant is less than the threshold, the MCS offset may be set to 0 (default behavior).

The threshold for determining a change level of the uplink channel may be determined by measuring a downlink channel through uplink/downlink channel reciprocity. That is, the threshold may be determined based on a measurement of the downlink channel. The measurement of the downlink channel may be determined based on a first downlink reference signal used in the subframe for transmitting the sounding reference signal and a second downlink reference signal used in the subframe for receiving the uplink grant. That is, the threshold may be determined by comparing a measurement of the downlink channel measured through the first downlink reference signal and a measurement of the downlink channel measured through the second downlink reference signal.

Here, the first downlink reference signal and the second downlink reference signal may include a beam reference signal (BRS), a beam refinement reference signal (BRRS), or a channel state information-reference signal (CSI-RS).

The processor transmits uplink data using a second MCS acquired from the first MCS and the MCS offset. The second MCS may be obtained using a difference between the first MCS and the MCS offset. Accordingly, the hybrid beamforming system may deal with a drastic change of the uplink channel that may occur by the use of a sharp analog beam. The MCS offset may be transmitted along with the uplink data.

For example, when an error occurs in transmitting the uplink data and in transmitting the MCS offset, the UE may receive an NACK of the uplink data and a third MCS arbitrarily set by the BS from the BS through an uplink grant. The third MCS may correspond to a retransmitting uplink (UL) MCS designated by the BS. The UE may compare the second MCS selected by the UE with the third MCS to determine that the BS fails to receive the MCS offset. Further, the UE may determine through the NACK of the uplink data that the BS also fails to receive the uplink data.

Accordingly, the UE may retransmit the uplink data to the BS using a fourth MCS acquired from the first MCS and a value greater than the MCS offset. That is, the UE may determine that an uplink channel environment is poor and thus may retransmit the uplink data through the fourth MCS having a smaller value than the second MCS.

For another example, when an error occurs in transmitting the uplink data, the UE may receive an NACK of the uplink data and the second MCS from the BS through an uplink grant. The UE may determine through the NACK of the uplink data that the BS fails to receive the uplink data. However, the UE receives the very second MCS selected by the UE is and thus may determine that the BS successfully receives the MCS offset. Accordingly, the UE may retransmit the uplink data to the BS using the second MCS.

For another example, when no error occurs in transmitting the uplink data and in transmitting the MCS offset, the UE may receive an ACK of the uplink data and information on remaining uplink data indicated by a buffer status report from the BS through an uplink grant. The buffer status report may be included in an additional scheduling request transmitted along with the uplink data. That is, the BS estimates uplink data quantity through the buffer status report included in the additional scheduling request. Since the MCS level is reduced by the MCS offset from the first MCS to the second MCS, there may be remaining data for the UE to transmit to the BS due to insufficient uplink resources. That is, the BS transmits scheduling information for transmitting the remaining uplink data to the UE through an uplink grant. Accordingly, the UE may transmit the remaining uplink data to the BS using the second MCS.

The MCS offset and the additional scheduling request may be transmitted, piggybacking on a physical uplink shared channel (PUSCH), or may be transmitted through a physical uplink control channel (PUCCH). That is, the second MCS and the additional scheduling request may be transmitted along with the uplink data.

The present specification proposes an operation in which a UE estimates an MCS offset to transmit uplink data through a UL MCS determined by the UE, instead of a UL MCS designated by a BS. Accordingly, the UE may stably transmit uplink data even when the UL MCS designated by the BS is not supported due to a drastic change in an uplink channel caused by the rotation or movement of the UE in a wireless communication system based on hybrid beamforming.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE. However, technical features of the present invention are not limited thereto.

Figure 1:
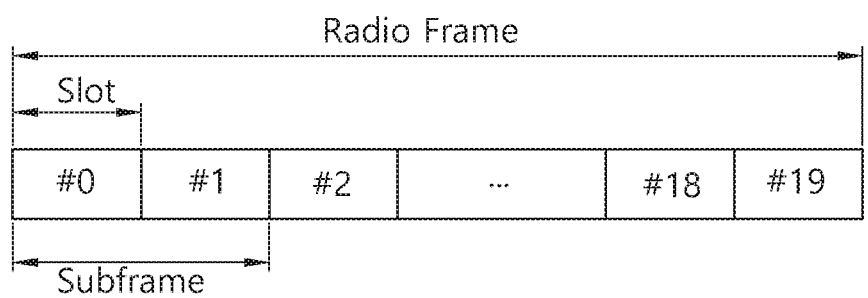
FIG. 1 shows a structure of a radio frame in 3GPP LTE.

FIG. 1 shows a structure of a radio frame in 3GPP LTE.

Referring to FIG. 1, the radio frame consists of 10 subframes. One subframe consists of 2 slots. The slots in the radio frame are numbered from slot number 0 to 19. A time required for transmitting one subframe is defined as a transmission time interval (TTI). The TTI is a unit of scheduling for transmitting a data. For example, one subframe may have a length of 1 millisecond (ms), and one slot may have a length of 0.5 ms.

The structure of the radio frame is for exemplary purposes only, and the number of subframes included in the radio frame or the number of slots included in the subframe and the number of SC-FDMA symbols included in the slot can change variously.

Figure 2:
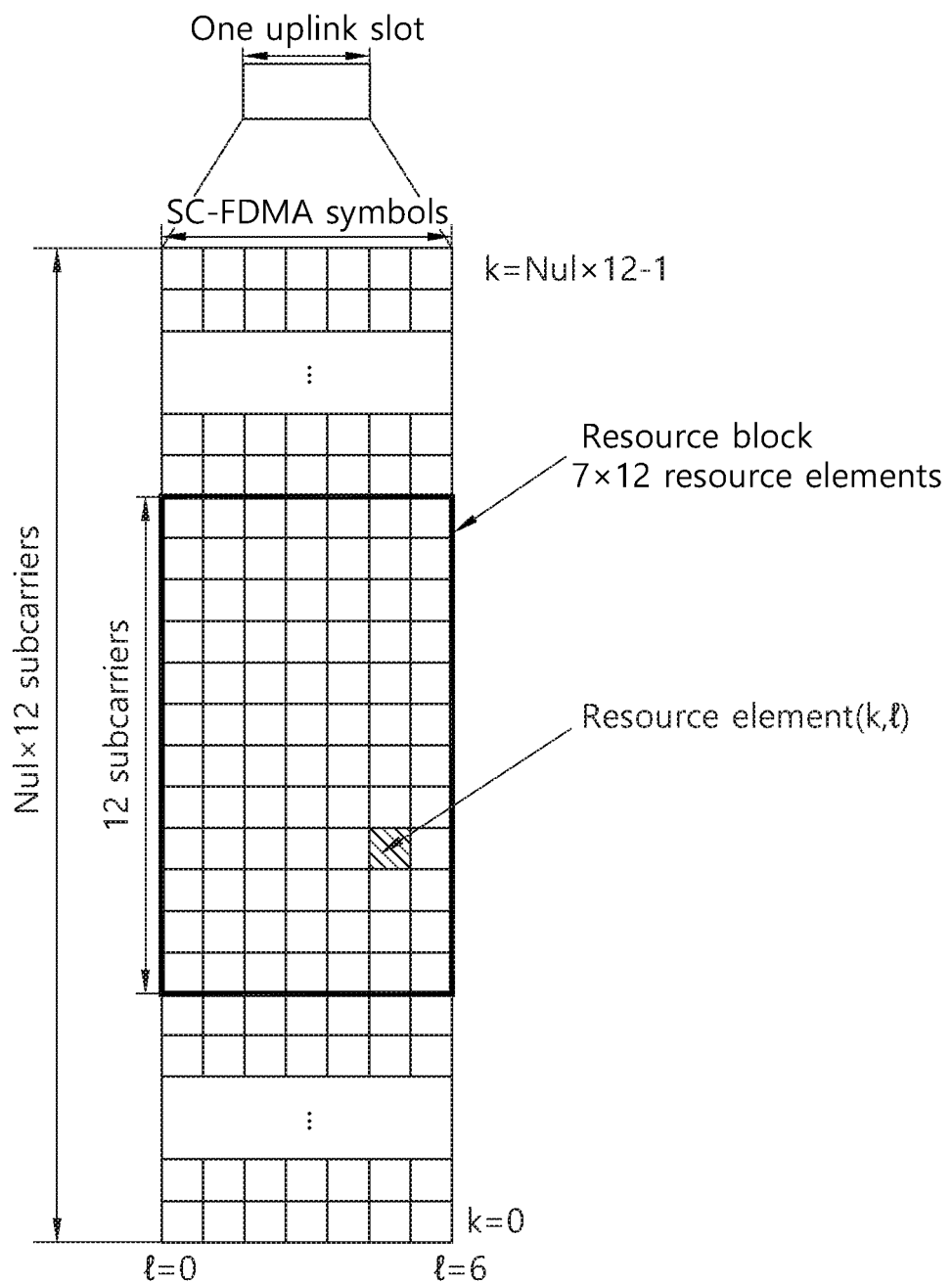
FIG. 2 is a diagram showing an example of a resource grid for one uplink slot in 3GPP LTE.

FIG. 2 is a diagram showing an example of a resource grid for one uplink slot in 3GPP LTE.

Referring to FIG. 2, The UL slot includes a plurality of SC-FDMA symbols in a time domain and includes a plurality of NUL RBs in a frequency domain. It is described that the SC-FDMA symbols are for representing one symbol period, and the SC-FDMA symbols can be OFDM symbols or symbol period according to the system. The RBs are a unit of resource allocation in the frequency domain and include 12 subcarriers. The number NUL of RBs included in the UL slot depends on a UL bandwidth defined in a cell. The UL bandwidth is system information. The UE may know NUL by acquiring the system information.

Each element on the resource grid is referred to as a resource element. One RB includes 12*7 resource elements. The resource element on the resource grid can be identified by an index pair (k, l) within the slot. Herein, $k(k=0, \ldots, NUL \times 12-1)$ denotes a subcarrier index in the frequency domain, and $l(l=0, \ldots, 6)$ denotes an SC-FDMA symbol index in the time domain.

Although it is described herein that one RB includes 7·12 resource elements consisting of 7 SC-FDMA symbols in the time domain and 12 subcarriers in the frequency domain for example, the number of SC-FDMA symbols and the number of subcarriers in the RB are not limited thereto. Thus, the number of subcarriers or the number of SC-FDMA symbols included in the RB may change variously. The number of SC-FDMA symbols may change depending on a cyclic prefix (CP) length. For example, when using a normal CP, the number of SC-FDMA symbols included in one slot is 7, and when using an extended CP, the number of SC-FDMA symbols included in one slot is 6.

In 3GPP LTE of FIG. 2, a resource grid for a single uplink slot may also be applied to a resource grid for a downlink slot. In this case, the downlink slot includes a plurality of orthogonal frequency division multiplexing (OFDM) symbols in a time domain.

Figure 3:
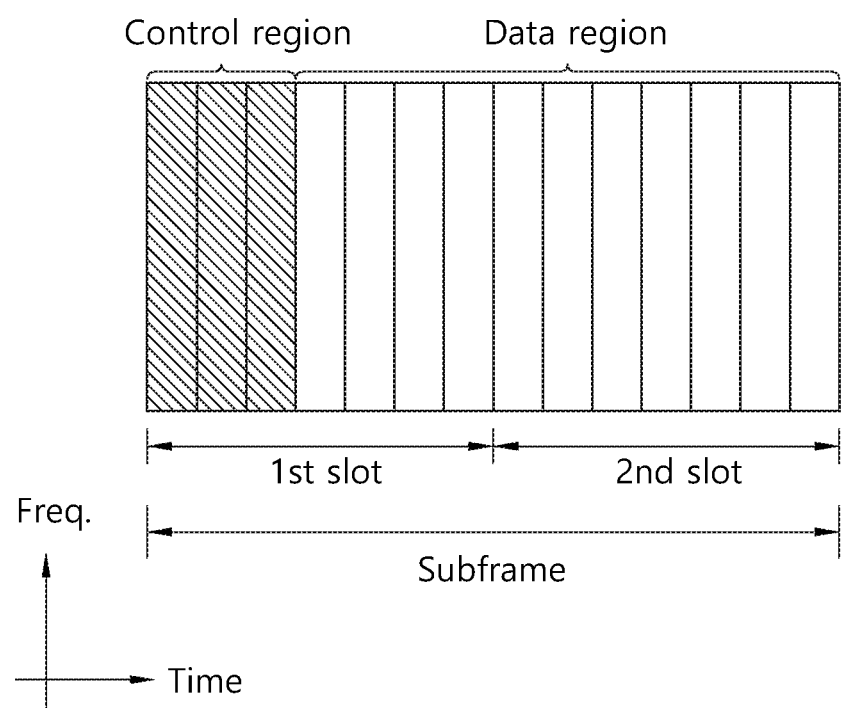
FIG. 3 shows an example of a structure of a downlink subframe in 3GPP LTE.

FIG. 3 shows an example of a structure of a downlink subframe in 3GPP LTE.

Referring to FIG. 3, a downlink subframe includes two contiguous slots. In the first slot of the downlink subframe, a maximum of the former three OFDM symbols become a control region to which a physical downlink control channel (PDCCH) is allocated, and the remaining OFDM symbols become a data region to which physical downlink shared channels (PDSCHs) are allocated. Control channels, such as a physical control format indicator channel (PCFICH) and a physical hybrid-ARQ indicator channel (PHICH), in addition to a PDCCH may be allocated to the control region. In this case, the inclusion of the three OFDM symbols in the control region is only an example. The number of OFDM symbols included in the control region of a subframe may be aware through a PCFICH. A PHICH carries hybrid automatic repeat request (HARQ) acknowledgement (ACK)/not-acknowledgement (NACK) information as a response to uplink data transmission.

A PDCCH may carry a downlink grant that provides notification of the resource allocation of downlink transmission on a PDSCH. UE may read downlink user data transmitted through a PDSCH by decoding control information transmitted through the PDCCH. Furthermore, the PDCCH may carry control information, used for physical uplink shared channel (PUSCH) scheduling, to the UE. The control information used for PUSCH scheduling is an uplink grant that provides notification of the resource allocation of uplink transmission.

A control region consists of an aggregation of a plurality of control channel elements (CCEs). A PDCCH is transmitted on an aggregation of one or some contiguous CCEs. A CCE corresponds to a plurality of resource element groups. A resource element group is used to define the mapping of a control channel to a resource element. In a downlink subframe, if a total number of CCEs is Ncce, CCE indices of 0 to Ncce,k−1 are assigned to CCEs. A total number of CCEs within a subframe may also be different in each subframe because the number of OFDM symbols included in a control region within a subframe may be different in each subframe.

Hereinafter, beamforming technology is described.

Beamforming may be divided into transmission beamforming performed at a transmitter and reception beamforming performed at a receiver. Transmission beamforming generally concentrates radio waves in a specified direction to a destination using a plurality of antennas, thereby increasing directivity. Here, a form of a plurality of antennas grouped may be referred to as an antenna array, and each antenna included in the antenna array may be referred to as an array element. The antenna array may be configured in various forms, for example, a linear array and a planar array. Further, using transmission beamforming enables an increase in the directivity of a signal, thus also increasing the transmission distance of the signal. In addition, since a signal is hardly transmitted in a direction other than an intended direction, signal interference of the receiver with another receiver is significantly reduced.

The receiver may perform beamforming on reception signals using a receiving antenna array. Reception beamforming concentrate received radio waves in a specified direction to increase the sensitivity of reception signals received in the specified direction and excludes a signal received in a direction other than the specified direction from the reception signals to provide a gain of blocking an interference signal.

Figure 4:
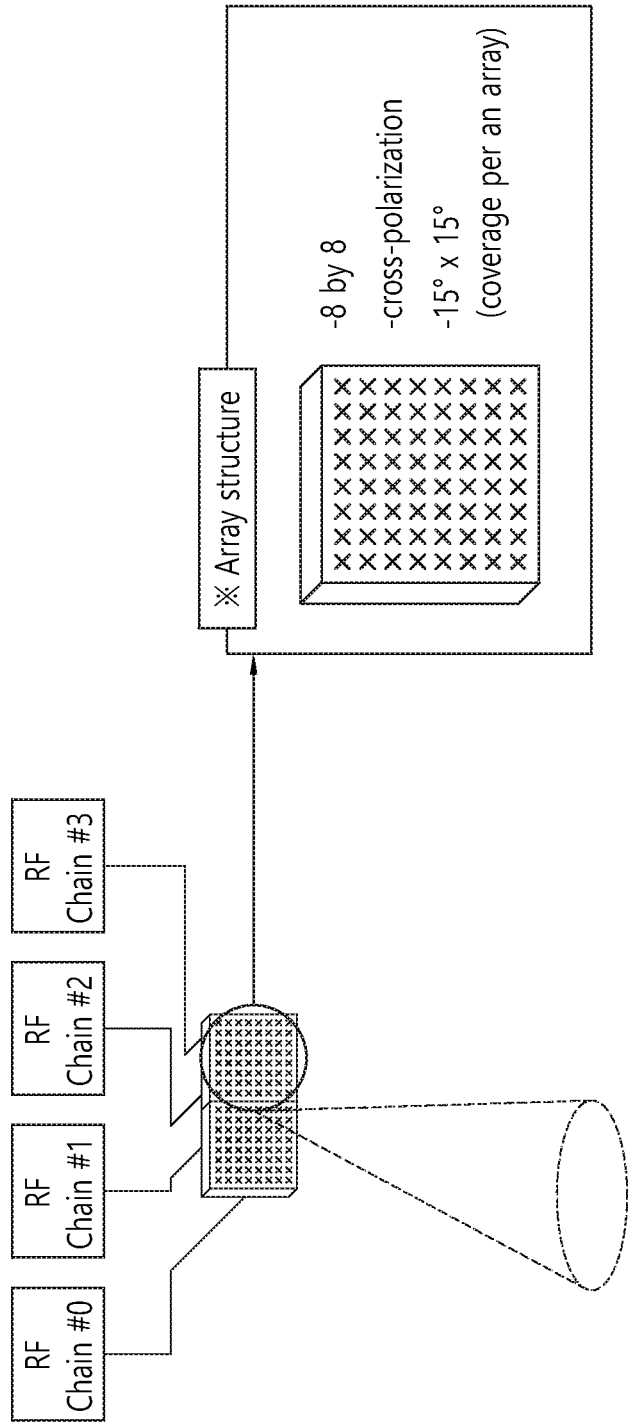
FIG. 4 illustrates an example of an antenna array-based antenna structure and a single beam.

FIG. 4 illustrates an example of an antenna array-based antenna structure and a single beam.

Referring to FIG. 4, one radio frequency (RF) beam (single beam) is defined using one antenna array including two sub-arrays. Here, one sub-array includes 8(H)*8(V)*2 (P) antennas (P represents Xpol) and has two RF chains. Further, one RF beam has a width of 15'(H)*15'(V).

Figure 5:
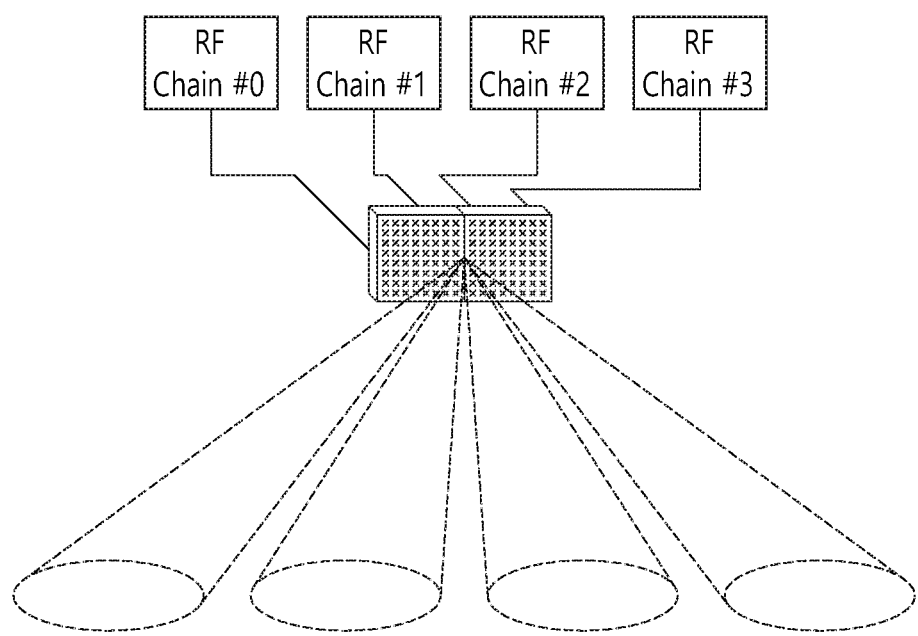
FIG. 5 illustrates an example of an antenna array-based antenna structure and a multi-beam.

FIG. 5 illustrates an example of an antenna array-based antenna structure and a multi-beam.

Referring to FIG. 5, RF beams (multi-beams) with different directions by each RF chain are defined. In this case, four beams by each RF chain may cover different areas.

When beam scanning is performed using the single beam or multi-beams, there are advantages and disadvantages illustrated below in Table 1.

TABLE 1

|  | Single beam | Multi-beam |
| --- | --- | --- |
| Advantage | Higher beam gain | Faster beam scanning |
| Disadvantage | Slower beam scanning | Lower beam gain |

Hereinafter, a method and an apparatus enabling a UE to feed back more accurate channel information on an available channel to a BS in an environment where a plurality of signals is transmitted to a single user or multiple users are proposed.

Figure 6:
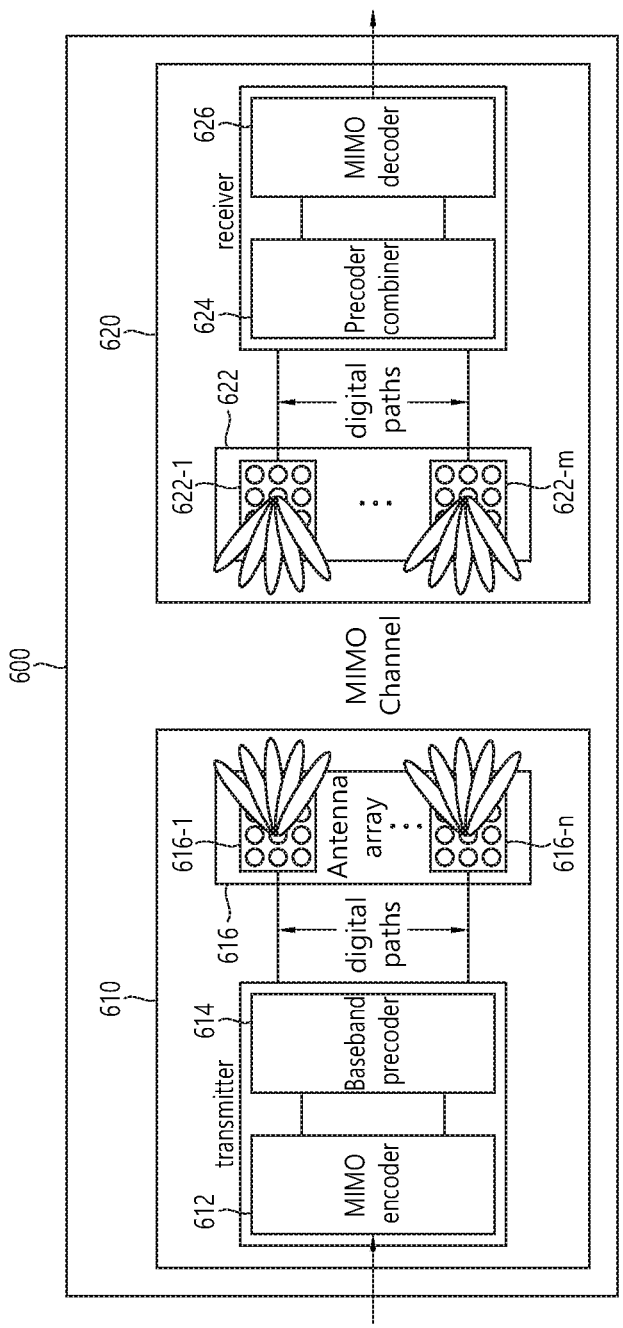
FIG. 6 is a diagram illustrating a configuration of a hybrid beamforming-based system to which an embodiment of the present specification is applicable.

FIG. 6 is a diagram illustrating a configuration of a hybrid beamforming-based system to which an embodiment of the present specification is applicable.

Referring to FIG. 6, the hybrid beamforming-based system 600 is configured to include, for example, a transmitter 610 and a receiver 620. The transmitter 610 includes a predetermined number of antenna arrays 616 each to form an MIMO channel. For the convenience of description, it is assumed that the transmitter 610 includes n antenna arrays 616-1, 616-2, . . . , and 616-n in total. Each of the antenna arrays 616-1, 616-2, . . . , and 616-n includes a predetermined number of antenna elements. Although it is illustrated herein that the antenna arrays each include the same number of antenna elements, the respective antenna arrays may include different numbers of antenna elements. The receiver 620 may include antenna arrays 622-1, 622-2, . . . , and 622-m configured the same as the antenna arrays of the transmitter 610. Here, it is assumed that the receiver 620 include, for example, m antenna arrays 622 in total. m and n each are a natural number of 1 or greater and may be set to the same value or different values depending on embodiments.

It is shown that the transmitter 610 includes an MIMO encoder 612 and a baseband precoder 614 to encode and precode a signal to transmit and the receiver 620 includes a baseband combiner 624 and an MIMO decoder 626 to combine and decode a signal received through the antenna arrays 622. The transmitter 610 and the receiver 620 are shown in a rough form including components for the convenience of description and may include specific components depending on embodiments of the present specification.

In the hybrid beamforming-based communication system mentioned above, when the transmitter transmits a plurality of signals to multiple users or a single user (hereinafter, referred to as 'multiplex transmission'), the transmitter may utilize channel information fed back from a corresponding receiver for various purposes. For example, the transmitter may apply a precoding mode based on the channel information in multiplex transmission to reduce interference between signals of a single user having a multi-antenna or interference between multiple users, thereby increasing system transmission capacity.

It is assumed that the hybrid beamforming-based communication system uses frequency division duplexing (FDD). In this case, when the receiver receives a reference signal from the transmitter, the receiver may estimate information on a channel between the transmitter and the receiver using the received reference signal. Further, the receiver feeds back the estimated channel information to the transmitter. For example, in an LTE-Advanced system, the feedback of the estimated channel information is referred to as the feedback of a precoding matrix indicator (PMI). The PMI fed back from the receiver is used for the transmitter to form a precoding matrix for the receiver. Specifically, the transmitter and the receiver store precoding matrices in advance, and the PMI indicates one of the precoding matrices.

Further, the receiver may further transmit a channel quality indicator (CQI) to the transmitter, and the transmitter may use the CQI for scheduling and the selection of an MCS.

When the hybrid beamforming-based communication system 600 operates in a millimeter wave band, the hybrid beamforming-based communication system 600 has a very narrow antenna form factor due to the high frequency band. Accordingly, it is very easy to configure the beamforming system using a plurality of array antennas. Beamforming in the millimeter wave band may apply different phase shift values to the antenna elements of each array, thereby transmitting a beam in a desired direction changed. Further, to compensate for high path loss in the millimeter wave band, the antenna elements may be disposed to have a narrow beam width.

Accordingly, the hybrid beamforming-based communication system 600 illustrated in FIG. 6 is different from an existing MIMO system in that the system 600 forms a beam using an antenna array.

Specifically, when the hybrid beamforming-based communication system is configured for multiple users, as a beam from each antenna array is shaper with an increasing in the number of included antennas arrays, the gain of an available channel for the antenna has a more significant difference. For example, in a beam division multiple access (BDMA) communication in which a single beam transmits a signal for only one user, the gain of an available channel for an antenna corresponding to the single beam may have a significantly higher value than those for other antennas, and the gain of an available channel for each of the other antennas may have a value approximating '0.'

Meanwhile, LTE-Advanced, which is one of the existing wireless communication standards, uses a code book based on a unitary matrix for PMI feedback. The unitary matrix has a property of a uniform channel gain with an insignificant deviation.

Further, in the hybrid beamforming-based communication system 600, a UE selects an analog beam corresponding to a beam formed by a physical antenna using a beam reference signal (BRS) and selects the best digital beam using a code book. The digital beam may correspond to a digital precoder. The UE may feed back the selected analog beam and the selected digital beam to a BS, and the BS may perform beamforming for the UE using the analog beam and the digital beam. The analog beam is rough, is wide in beam width, and varies slowly. The digital beam is precise, is narrow in beam width, and varies fast. Thus, the hybrid beamforming-based communication system 600 may finally obtain a sharp beam.

In an existing LTE system, primary synchronization channels (P-SCHs) are positioned in the last OFDM symbols of a zeroth slot and a tenth slot of a radio frame. The two P-SCHs use the same primary synchronization signal (PSS). The P-SCHs are used to obtain an OFDM symbol synchronization or slot synchronization. The PSS may use a Zadoff-Chu (ZC) sequence, and each PSS may represent a cell identity according to a root value of the ZC sequence. When there are three PSSs, the BS selects one of the three PSSs to transmit the PSS on the last OFDM symbols of the zeroth slot and the tenth slot.

Secondary synchronization channels (S-SCHs) are positioned in OFDM symbols directly preceding the last OFDM symbols of the zeroth slot and the tenth slot of the radio frame. The S-SCHs and the P-SCHs may be positioned in the contiguous OFDM symbols. The S-SCHs are used to obtain a frame synchronization. One S-SCH uses two secondary synchronization signals (SSSs). One S-SCH includes two PN sequences, that is, m-sequences. For example, when one S-SCH includes 64 subcarriers, two PN sequences with a length of 31 are mapped to one S-SCH.

The number or positions of OFDM symbols where the P-SCHs and the S-SCHs are deployed on slots are provided for illustrative purposes and may be changed variously depending on systems.

Hereinafter, a structure of a subframe for transmitting a synchronization signal in a millimeter wave band system is described.

Figure 7:
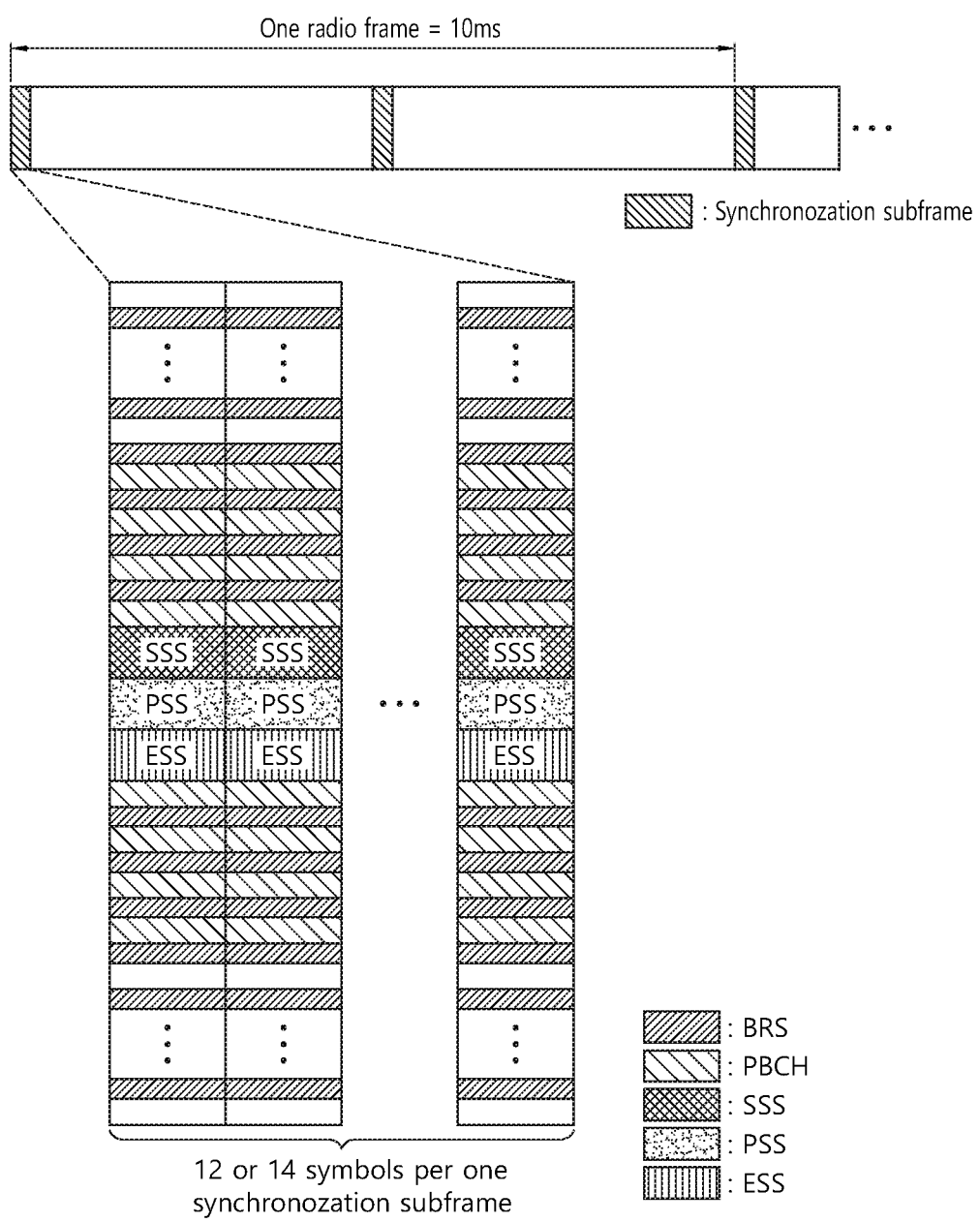
FIG. 7 illustrates an example of a structure of a synchronization subframe including a synchronization signal and a BRS according to an embodiment of the present specification.

FIG. 7 illustrates an example of a structure of a synchronization subframe including a synchronization signal and a BRS according to an embodiment of the present specification.

A reference signal, such as a channel state indicator (CSI)-reference signal (RS) is transmitted separately with respect to a plurality of beams supported by a BS according to a time division multiplexing (TDM) mode, a frequency division multiplexing (FDM) mode, or a code division multiplexing (CDM) mode. A CSI-RS has a wide beam radiation angle of about 120 degrees for each antenna port. Here, a BRS applicable in the embodiment of the present specification is a reference signal for feeding back beam state information on a plurality of beams. The BRS may have a narrow beam radiation angle as compared with the CSI-RS and thus may be applied to a sharp beam. Further, the BRS may be multiplexed by antenna port in one symbol according to the FDM mode, thus being transmitted during at least one subframe. Here, one antenna port may correspond to one among a plurality of beams per symbol of the at least one subframe. That is, as illustrated in FIG. 7, the BRS may be transmitted only via different resource elements (REs) by antenna port.

A subframe for transmitting the BRS may be referred to as a synchronization subframe. The synchronization subframe includes 12 or 14 symbols and may be transmitted according to a transmission period in which one synchronization subframe is transmitted every 5 ms. Here, it is assumed that the synchronization subframe includes 14 symbols (two slots) considering that the synchronization subframe is a normal CP. The symbols may correspond to OFDM symbols.

A UE acquires a downlink synchronization using a PSS, SSS, and/or extended synchronization signal (ESS) and selects an optimal beam using the BRS. Referring to FIG. 7, a synchronization signal, such as the PSS, SSS, and/or ESS, occupies a relatively narrow band based on a center frequency. On the contrary, the BRS occupies the entire system band of a BS and thus enables the search for an optimal beam based on a broadband channel.

The PSS, SSS, and/or ESS are multiplexed within one symbol by the FDM mode. Further, the BRS is multiplexed within one symbol by the FDM mode, like the synchronization signal including the PSS, SSS, and/or ESS. Since a sharp beam is used in the millimeter wave band, the synchronization subframe in FIG. 7 may be used to entirely cover an area corresponding to a beam radiation angle of 120 degrees. The synchronization subframe includes 14 PSSs, which indicate different directions. The UE achieves time synchronization with a PSS having the highest received power among the 14 PSSs.

A conventional broadband wireless communication system uses an adaptive modulation and coding (AMC) scheme in order to increase the data transmission efficiency of a radio link and uses an outer loop rate control (OLRC) scheme in order to improve a Modulation order Product code Rate (MPR).

The AMC scheme employs a different MCS depending on the state and changing conditions of a radio channel of a UE and applies separate modulation and coding schemes to a short-distance UE and a long-distance UE to guarantee higher data transmission performance. The OLRC scheme re-determines an MCS level (or MPR) for data to transmit according to hybrid automatic repeat request (HARQ) information of an MAC terminal, that is, whether an HAR ACK/NACK signal is received, and reflects the MCS level in a scheduling operation.

The UE reports a downlink channel quality indicator (CQI) and HARQ feedback (ACK/NACK) information to the BS at every given time. The BS determines an MCS level for a data block to transmit based on the received feedback information and reflects the MCS level in scheduling.

The BS transmits data using a higher MCS level as the UE reports a higher CQI, while the BS transmits data using a lower MCS level as the UE reports a lower CQI. Further, the BS operates to increase or decrease an MPR according to whether an HARQ ACK/NACK signal is received. Generally, the BS increases an MPR when an ACK signal is consecutively received once or more times, and the BS decreases an MPR when an NACK signal is consecutively received once or more times. Increasing an MPR means increasing an MCS level, and decreasing an MPR means decreasing an MCS level.

The BS estimates the channel state of the UE based on channel state information (for example, a CQI or the like) periodically reported by the UE and determines which section of an electric field section (section from a cell center to a cell edge) the UE is positioned in based on the estimated channel state. Here, the BS may measure the received strength of a sounding reference signal (SRS) periodically transmitted from the UE, thereby more accurately determining the position of the UE. The BS may estimate a moving pattern (moving direction and moving speed) of the UE based on the received strength of the SRS. Further, when the position and the moving pattern of the UE are determined, the BS may determine an MCS level corresponding to the UE according to the position and the moving pattern of the UE.

That is, the BS determines an uplink (UL) MIMO precoder and a UL MCS based on the SRS from the UE and transmits a UL grant to the UE. Here, when a significant change occurs to the channel by blockage, the rotation of the UE, or the like between an SRS transmission time and an uplink data transmission time of the UE, a UL MCS designated by the BS is not supported. Since the UE uses a sharp analog beam in a hybrid beamforming system, a drastic change may occur in the uplink channel by the rotation of the UE.

To solve the foregoing problem, the present specification proposes a method in which a UE transmits uplink data using an MCS selected by the UE based on a UE-estimated MCS offset (which may be obtained by 'BS-designated MCS-MCS offset').

Figure 8:
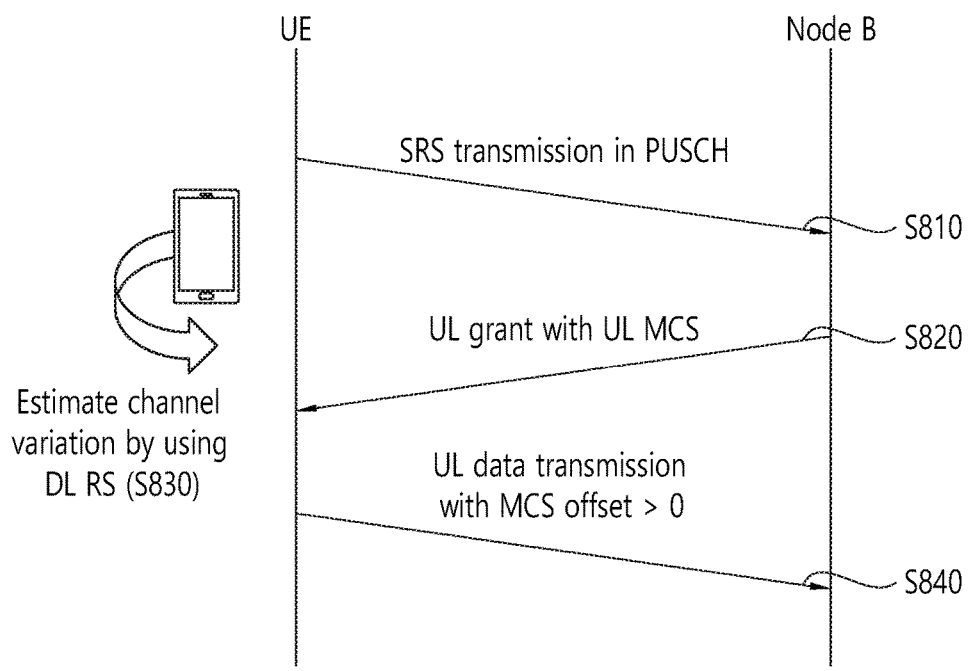
FIG. 8 illustrates an example of transmitting uplink data by estimating an MCS offset according to an embodiment of the present specification.
Figure 9:
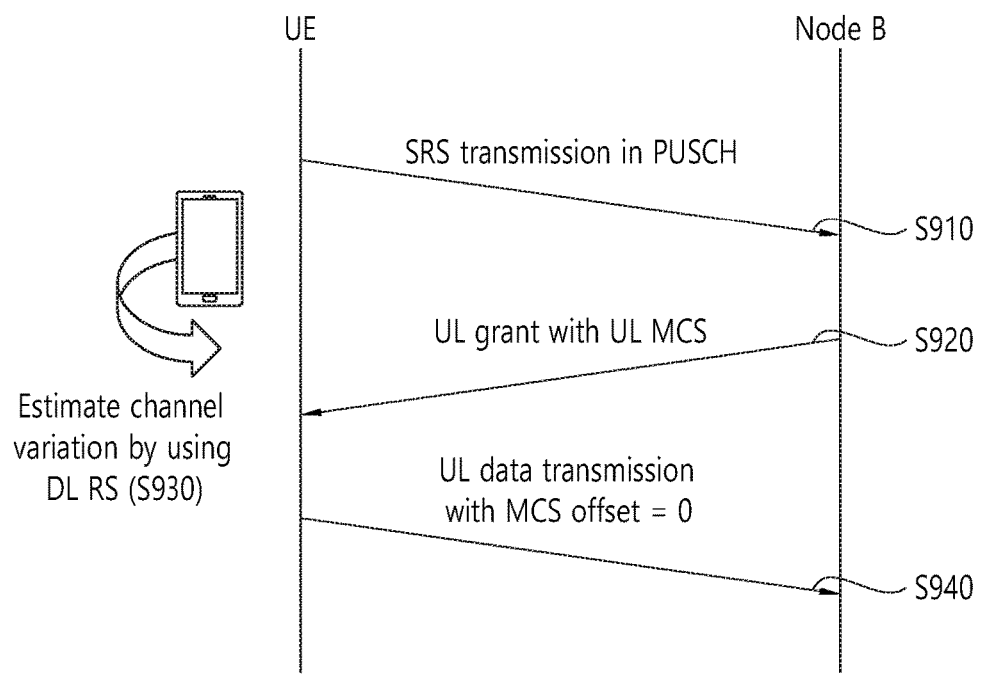
FIG. 9 illustrates another example of transmitting uplink data by estimating an MCS offset according to an embodiment of the present specification.

FIG. 8 illustrates an example of transmitting uplink data by estimating an MCS offset according to an embodiment of the present specification. FIG. 9 illustrates another example of transmitting uplink data by estimating an MCS offset according to an embodiment of the present specification.

The UE transmits uplink data using a UE-selected MCS based on a UE-estimated MCS offset, instead of using a BS-designated UL MCS. Specifically, the UE determines the MCS offset using one of two methods illustrated in FIG. 8 and FIG. 9.

FIG. 8 illustrates an example (optional behavior) in which when a channel variation between the time the UE transmits an SRS (S810) and the time the UE receives a UL grant (S820) is a threshold or greater (or exceeds the threshold), the UE sets an MCS offset to a value greater than 0 and transmits uplink data (S840). FIG. 9 illustrates an example (default behavior) in which when a channel variation between the time the UE transmits an SRS (S910) and the time the UE receives a UL grant (S920) is less than a threshold or greater (or the threshold or less), the UE sets an MCS offset to 0 and transmits uplink data (S940).

Here, the MCS offset is transmitted, piggybacking (multiplexing uplink channel information (UCI) with a PUCSH) on a physical uplink shared channel (PUSCH), or is transmitted through a physical uplink control channel (PUCCH). When it is difficult to transmit all uplink data for the UE to transmit using the selected MCS through physical resource blocks (PRBs) allocated by the BS in this process, the UE transmits an additional scheduling request (SR) including a buffer status report (BSR) along with the uplink data. The BSR includes an indicator indicating that there is remaining data for the UE to transmit to the BS and information on the amount of the data (the amount of the data stacked in a buffer of the UE). Here, the additional SR including the BSR is transmitted, piggybacking on the PUSCH, or is transmitted through the PUCCH.

In the foregoing process, the threshold of the uplink channel variation is determined by measuring a downlink channel using uplink/downlink channel reciprocity (S830 and S930). That is, the threshold of the uplink channel variation is determined by comparing a measurement of a downlink channel, measured in a subframe for transmitting the SRS or a subframe adjacent to the subframe for transmitting the SRS, with a measurement of a downlink channel, measured in a subframe for receiving the UL grant or a subframe adjacent to the subframe for receiving the UL grant.

Here, the measurement of the downlink channel may be determined using a downlink reference signal, such as a beam reference signal (BRS), a beam refinement reference signal (BRRS), and a channel state information-reference signal (CSI-RS). When the downlink reference signal is a non-beamformed reference signal, an estimated value or quality change of the channel may be measured. When the downlink reference signal is a beamformed reference signal, not only a change in the quality of a preferred reference signal port but also a change in the index of the preferred reference signal port may be measured.

When there is no downlink reference signal in the subframes adjacent to the subframes for the SRS and the UL grant for measuring the uplink channel variation, the UE sets the MCS offset to 0 as in FIG. 9 (default behavior).

Further, the MCS offset may be set to a value corresponding to a channel variation or a random value designated in advance through radio resource control (RRC).

Hereinafter, operations of a BS and a UE in a retransmission process are described in two cases in which an error occurs in a PUSCH through which the BS transmits an MCS offset and in which an error occurs in a PUSCH transmitted with a UE-selected MCS (BS-designated MCS-MCS offset). That is, FIG. 10 and FIG. 11 illustrate the operations of the BS and the UE in the retransmission process.

Figure 10:
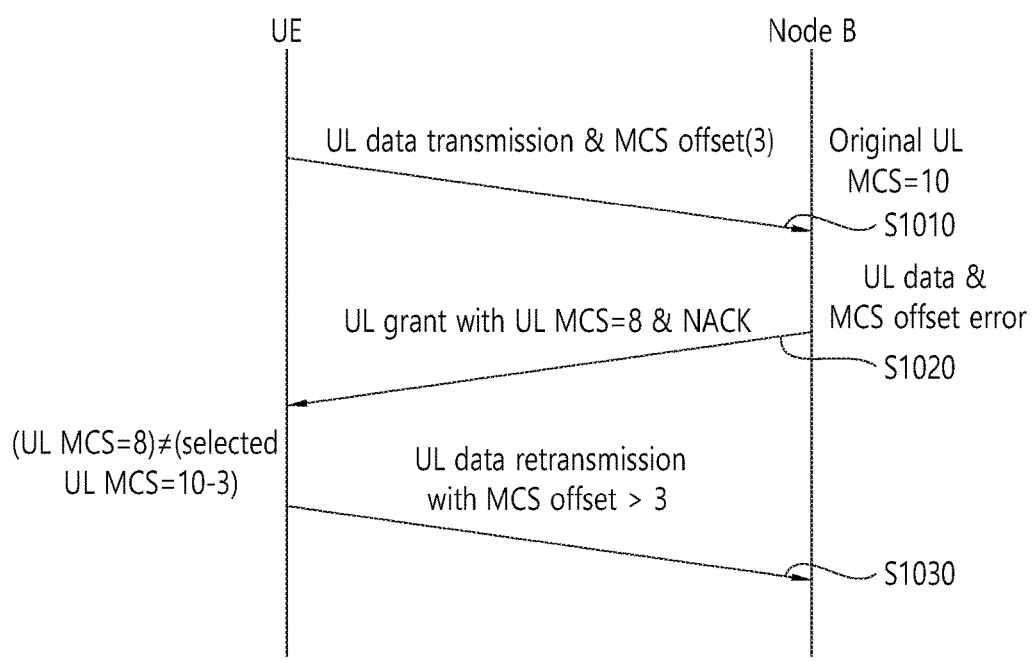
FIG. 10 illustrates an example of retransmitting uplink data when an error occurs in transmitting an MCS offset and the uplink data according to an embodiment of the present specification.
Figure 11:
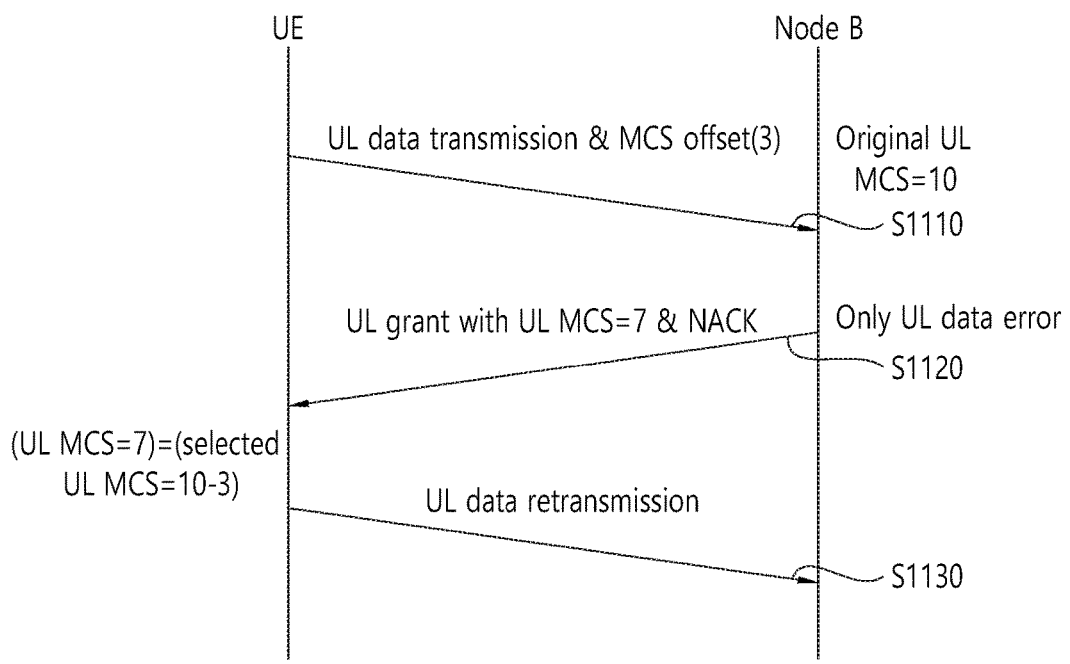
FIG. 11 illustrates an example of retransmitting uplink data when an error occurs only in transmitting the uplink data according to an embodiment of the present specification.

FIG. 10 illustrates an example of retransmitting uplink data when an error occurs in transmitting an MCS offset and the uplink data according to an embodiment of the present specification.

Referring to FIG. 10, when an error occurs in transmitting an MCS offset and uplink data (S1010), the BS transmits a UL grant including NACK information on the uplink data along with a determined random MCS value designated in advance, instead of a UL MCS value previously designated by the BS (S1020). The UE compares the UE-selected MCS value with a retransmitting UL MCS designated by the BS, thereby determining that an error occurs when the BS receives the MCS offset value. Further, the UE may determine using the NACK information that an error occurs when the BS receives the uplink data. The UE determines that an error occurs in transmitting both the MCS offset and the uplink data through the foregoing process, sets the MCS offset to a value greater than the previous value (likewise, a random value designated in advance), and retransmits the uplink data using a lower MCS (S1030).

For example, it is assumed in FIG. 10 that the UL MCS previously designated by the BS is 10, an MCS offset estimated by the UE is 3, and a random MCS designated in advance in a retransmitting UL grant from the BS is 8. As described above, the UE compares the UE-selected MCS value (7) with the BS-designated retransmitting UL MCS (8), thereby determining that an error occurs when the BS receives the MCS offset value (7≠8).

FIG. 11 illustrates an example of retransmitting uplink data when an error occurs only in transmitting the uplink data according to an embodiment of the present specification.

Referring to FIG. 11, when an error occurs only in transmitting uplink data through a PUSCH (S1110), the BS sets a UL MCS to a UE-selected UL MCS and transmits a retransmitting UL grant including NACK information on the uplink data to the UE (S1120). Here, the BS allocates uplink resources by estimating uplink data in a BSR included in an existing SR, disregarding a BSR included in an additional SR. The UE may determine that an error occurs only in transmitting the uplink data through the NACK information on the uplink data and a retransmitting UL MCS. The UE determines that an error occurs only in transmitting the uplink data through the foregoing process and retransmits the uplink data using the UE-selected UL MCS (S1130).

For example, it is assumed in FIG. 11 that the UL MCS previously designated by the BS is 10, an MCS offset estimated by the UE is 3, and the BS sets the UL MCS to the UE-selected UL MCS. As described above, the UE compares the UE-selected MCS value (7) with the BS-transmitted retransmitting UL MCS (7), thereby determining that the BS normally receives the MCS offset value (7=7).

When the BS normally receives both the MCS offset value and the uplink data transmitted through the PUSCH, the BS estimates the amount of uplink data through the BSR included in the additional SR and allocates uplink resources. That is, the BS transmits scheduling information for transmitting remaining uplink data along with ACK information on the uplink data to the UE through a UL grant. When the UL grant is received, the UE transmits the remaining uplink data to the BS.

Figure 12:
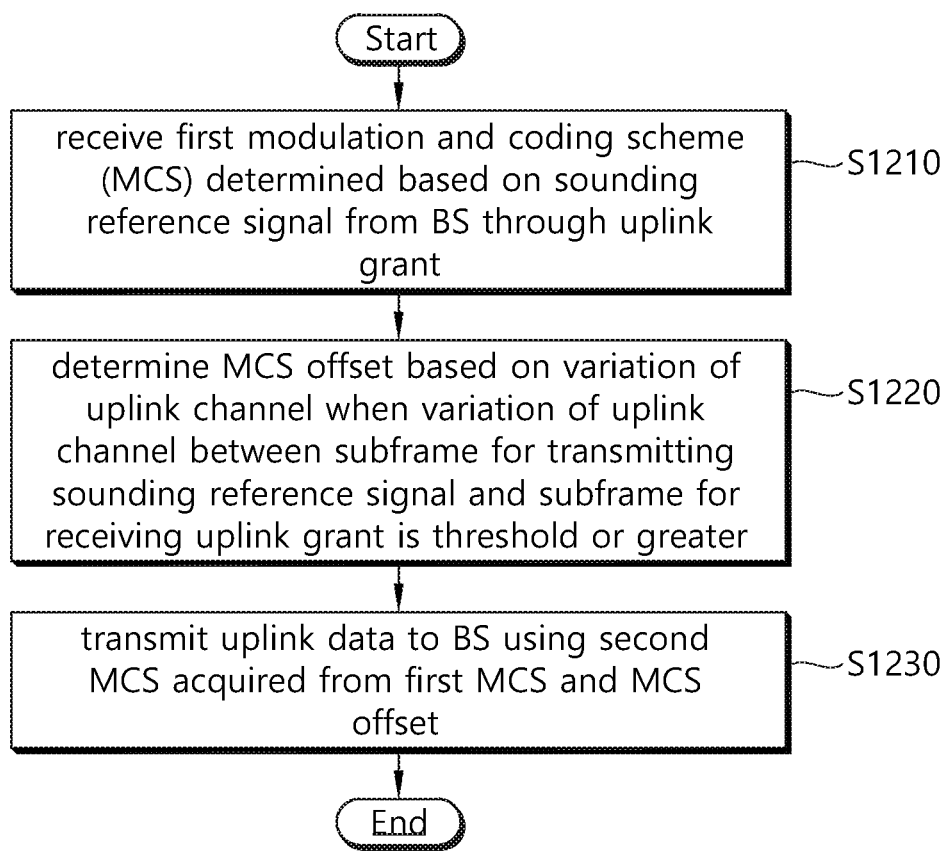
FIG. 12 is a flowchart illustrating a procedure for transmitting uplink data based on hybrid beamforming according to an embodiment of the present specification.

FIG. 12 is a flowchart illustrating a procedure for transmitting uplink data based on hybrid beamforming according to an embodiment of the present specification.

First, in operation S1210, a UE receives a first MCS determined based on a sounding reference signal from a BS through an uplink grant. The BS may determine the first MCS corresponding to the UE by determining the position and moving pattern of the UE through the sounding reference signal in a hybrid beamforming system.

In operation 1220, when a variation of an uplink channel between a subframe for transmitting the sounding reference signal and a subframe for receiving the uplink grant is a threshold or greater, the UE determines an MCS offset based on the variation of the uplink channel. The subframes may correspond to a specified time. That is, when a drastic change in the channel occurs by a factor, such as the rotation of the UE, between the transmission time of the sounding reference signal and the reception time of the uplink grant, the first MCS designated by the BS may not be supported. Thus, to cope with this change of the channel, the UE may estimate the MCS offset to determine a new MCS (second MCS).

When the variation of the uplink channel between the subframe for transmitting the sounding reference signal and the subframe for receiving the uplink grant is the threshold or greater, the MCS offset may be set to a value greater than 0 (optional behavior). However, when the variation of the uplink channel between the subframe for transmitting the sounding reference signal and the subframe for receiving the uplink grant is less than the threshold, the MCS offset may be set to 0 (default behavior).

The threshold for determining a change level of the uplink channel may be determined by measuring a downlink channel through uplink/downlink channel reciprocity. That is, the threshold may be determined based on a measurement of the downlink channel. The measurement of the downlink channel may be determined based on a first downlink reference signal used in the subframe for transmitting the sounding reference signal and a second downlink reference signal used in the subframe for receiving the uplink grant. That is, the threshold may be determined by comparing a measurement of the downlink channel measured through the first downlink reference signal and a measurement of the downlink channel measured through the second downlink reference signal.

Here, the first downlink reference signal and the second downlink reference signal may include a beam reference signal (BRS), a beam refinement reference signal (BRRS), or a channel state information-reference signal (CSI-RS).

In operation S1230, the UE transmits uplink data using a second MCS acquired from the first MCS and the MCS offset. The second MCS may be obtained using a difference between the first MCS and the MCS offset. Accordingly, the hybrid beamforming system may deal with a drastic change of the uplink channel that may occur by the use of a sharp analog beam. The MCS offset may be transmitted along with the uplink data.

For example, when an error occurs in transmitting the uplink data and in transmitting the MCS offset, the UE may receive an NACK of the uplink data and a third MCS arbitrarily set by the BS from the BS through an uplink grant. The third MCS may correspond to a retransmitting uplink (UL) MCS designated by the BS. The UE may compare the second MCS selected by the UE with the third MCS to determine that the BS fails to receive the MCS offset. Further, the UE may determine through the NACK of the uplink data that the BS also fails to receive the uplink data.

Accordingly, the UE may retransmit the uplink data to the BS using a fourth MCS acquired from the first MCS and a value greater than the MCS offset. That is, the UE may determine that an uplink channel environment is poor and thus may retransmit the uplink data through the fourth MCS having a smaller value than the second MCS.

For another example, when an error occurs in transmitting the uplink data, the UE may receive an NACK of the uplink data and the second MCS from the BS through an uplink grant. The UE may determine through the NACK of the uplink data that the BS fails to receive the uplink data. However, the UE receives the very second MCS selected by the UE is and thus may determine that the BS successfully receives the MCS offset. Accordingly, the UE may retransmit the uplink data to the BS using the second MCS.

For another example, when no error occurs in transmitting the uplink data and in transmitting the MCS offset, the UE may receive an ACK of the uplink data and information on remaining uplink data indicated by a buffer status report from the BS through an uplink grant. The buffer status report may be included in an additional scheduling request transmitted along with the uplink data. That is, the BS estimates uplink data quantity through the buffer status report included in the additional scheduling request. Since the MCS level is reduced by the MCS offset from the first MCS to the second MCS, there may be remaining data for the UE to transmit to the BS due to insufficient uplink resources. That is, the BS transmits scheduling information for transmitting the remaining uplink data to the UE through an uplink grant. Accordingly, the UE may transmit the remaining uplink data to the BS using the second MCS.

The MCS offset and the additional scheduling request may be transmitted, piggybacking on a PUSCH, or may be transmitted through a PUCCH. That is, the second MCS and the additional scheduling request may be transmitted along with the uplink data.

Figure 13:
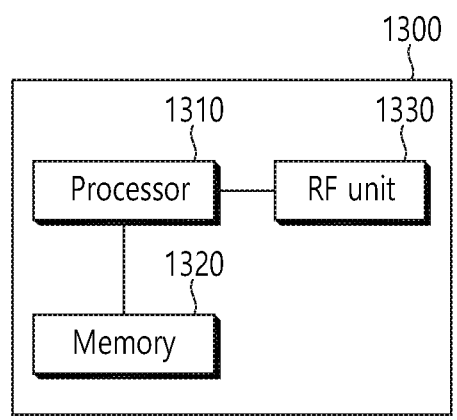
FIG. 13 is a block diagram showing an apparatus for wireless communication for implementing an embodiment of the present specification.

FIG. 13 is a block diagram showing an apparatus for wireless communication for implementing an embodiment of the present specification.

An apparatus 1300 for wireless communication includes a processor 1310, a memory 1320 and a radio frequency (RF) unit 1330.

The processor 1310 may be configured to implement proposed functions, procedures and/or methods described in this description. Layers of the radio interface protocol may be implemented in the processor 1310. The processor 1310 may handle a procedure explained above. The memory 1320 is operatively coupled with the processor 1310, and the RF unit 1330 is operatively coupled with the processor 1310.

The processor 1310 may include application-specific integrated circuit (ASIC), other chipset, logic circuit and/or data processing device. The memory 1320 may include read-only memory (ROM), random access memory (RAM), flash memory, memory card, storage medium and/or other storage device. The RF unit 1330 may include baseband circuitry to process radio frequency signals. When the embodiments are implemented in software, the techniques described herein can be implemented with modules (e.g., procedures, functions, and so on) that perform the functions described herein. The modules can be stored in memory 1320 and executed by processor 1310. The memory 1320 can be implemented within the processor 1310 or external to the processor 1310 in which case those can be communicatively coupled to the processor 1310 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims. Furthermore, the technical concepts in the described embodiments may be identically applied, and embodiments in which the number of subframes and the number of special symbols within a radio frame are differently defined may be included in the technical scope of this specification.

What is claimed is:

1. A method for transmitting, by a user equipment (UE), uplink data based on hybrid beamforming in a wireless communication system, the method comprising:
   receiving a first modulation and coding scheme (MCS) determined based on a sounding reference signal from a base station (BS) through an uplink grant;
   determining an MCS offset based on a variation of an uplink channel when the variation of the uplink channel between a subframe for transmitting the sounding reference signal and a subframe for receiving the uplink grant is greater than or equal to a threshold; and
   transmitting uplink data to the BS using a second MCS acquired from the first MCS and the MCS offset.

2. The method of claim 1, wherein the threshold is determined based on a measurement of a downlink channel, and the measurement of the downlink channel is determined based on a first downlink reference signal used in the subframe for transmitting the sounding reference signal and a second downlink reference signal used in the subframe for receiving the uplink grant.

3. The method of claim 2, wherein the first downlink reference signal and the second downlink reference signal comprise a beam reference signal (BRS), a beam refinement reference signal (BRRS), or a channel state information-reference signal (CSI-RS).

4. The method of claim 1, wherein when the variation of the uplink channel between the subframe for transmitting the sounding reference signal and the subframe for receiving the uplink grant is greater than or equal to the threshold, the MCS offset is set to a value greater than 0, and
when the variation of the uplink channel between the subframe for transmitting the sounding reference signal and the subframe for receiving the uplink grant is less than the threshold, the MCS offset is set to 0.

5. The method of claim 1, further comprising:
when an error occurs in transmitting the uplink data and in transmitting the MCS offset,
receiving a not-acknowledgement (NACK) of the uplink data and a third MCS arbitrarily set by the BS from the BS through an uplink grant; and
retransmitting the uplink data to the BS using a fourth MCS acquired from the first MCS and a value greater than the MCS offset.

6. The method of claim 1, further comprising:
when an error occurs in transmitting the uplink data,
receiving a not-acknowledgement (NACK) of the uplink data and the second MCS from the BS through an uplink grant; and
retransmitting the uplink data to the BS using the second MCS.

7. The method of claim 1, further comprising:
when no error occurs in transmitting the uplink data and in transmitting the MCS offset,
receiving an acknowledgement (ACK) of the uplink data and information on remaining uplink data indicated by a buffer status report from the BS through an uplink grant; and
transmitting the remaining uplink data to the BS using the second MCS,
wherein the buffer status report is comprised in an additional scheduling request transmitted along with the uplink data.

8. The method of claim 7, wherein the MCS offset and the additional scheduling request is transmitted, piggybacking on a physical uplink shared channel (PUSCH), or is transmitted through a physical uplink control channel (PUCCH).

9. A user equipment (UE) for transmitting uplink data based on hybrid beamforming in a wireless communication system, the UE comprising:
a transceiver that transmits and receives a radio signal; and
a processor operatively connected to the transceiver,
wherein the processor receives a first modulation and coding scheme (MCS) determined based on a sounding reference signal from a base station (BS) through an uplink grant; determines an MCS offset based on a variation of an uplink channel when the variation of the uplink channel between a subframe for transmitting the sounding reference signal and a subframe for receiving the uplink grant is greater than or equal to a threshold; and transmits uplink data to the BS using a second MCS acquired from the first MCS and the MCS offset.

10. The UE of claim 9, wherein the threshold is determined based on a measurement of a downlink channel, and the measurement of the downlink channel is determined based on a first downlink reference signal used in the subframe for transmitting the sounding reference signal and a second downlink reference signal used in the subframe for receiving the uplink grant.

11. The UE of claim 10, wherein the first downlink reference signal and the second downlink reference signal comprise a beam reference signal (BRS), a beam refinement reference signal (BRRS), or a channel state information-reference signal (CSI-RS).

12. The UE of claim 9, wherein when the variation of the uplink channel between the subframe for transmitting the sounding reference signal and the subframe for receiving the uplink grant is greater than or equal to the threshold, the MCS offset is set to a value greater than 0, and
when the variation of the uplink channel between the subframe for transmitting the sounding reference signal and the subframe for receiving the uplink grant is less than the threshold, the MCS offset is set to 0.

13. The UE of claim 9, wherein when an error occurs in transmitting the uplink data and in transmitting the MCS offset, the processor receives a not-acknowledgement (NACK) of the uplink data and a third MCS arbitrarily set by the BS from the BS through an uplink grant, and retransmits the uplink data to the BS using a fourth MCS acquired from the first MCS and a value greater than the MCS offset.

14. The UE of claim 9, wherein when an error occurs in transmitting the uplink data, the processor receives a not-acknowledgement (NACK) of the uplink data and the second MCS from the BS through an uplink grant, and retransmits the uplink data to the BS using the second MCS.

15. The UE of claim 9, wherein when no error occurs in transmitting the uplink data and in transmitting the MCS offset, the processor receives an acknowledgement (ACK) of the uplink data and information on remaining uplink data indicated by a buffer status report from the BS through an uplink grant, and transmits the remaining uplink data to the BS using the second MCS, and the buffer status report is comprised in an additional scheduling request transmitted along with the uplink data.

16. The UE of claim 15, wherein the MCS offset and the additional scheduling request is transmitted, piggybacking on a physical uplink shared channel (PUSCH), or is transmitted through a physical uplink control channel (PUCCH).

* * * * *